(12) United States Patent
Slone

(10) Patent No.: US 12,181,272 B2
(45) Date of Patent: Dec. 31, 2024

(54) GEAR INSPECTION SYSTEM

(71) Applicant: SLONE GEAR INTERNATIONAL, INC., Tipp City, OH (US)

(72) Inventor: Brian W. Slone, Dayton, OH (US)

(73) Assignee: Slone Gear International, Inc., Tipp City, OH (US)

( * ) Notice: Subject to any disclaimer, the term of this patent is extended or adjusted under 35 U.S.C. 154(b) by 470 days.

(21) Appl. No.: 17/473,275

(22) Filed: Sep. 13, 2021

(65) Prior Publication Data

US 2022/0099434 A1 Mar. 31, 2022

Related U.S. Application Data

(60) Provisional application No. 63/083,401, filed on Sep. 25, 2020.

(51) Int. Cl.
*G01B 11/24* (2006.01)
*B23F 23/12* (2006.01)
(Continued)

(52) U.S. Cl.
CPC ....... *G01B 11/2416* (2013.01); *G01M 13/021* (2013.01); *B23F 23/1218* (2013.01); *G01B 5/004* (2013.01)

(58) Field of Classification Search
CPC .............. B23F 23/1218; G01B 5/0004; G01B 11/2416; G01M 13/021
(Continued)

(56) References Cited

U.S. PATENT DOCUMENTS 1,539,972 A * 6/1925 Todd .................... B65H 75/245
242/571.5
3,099,901 A * 8/1963 Hunkeler .............. B23F 19/055
73/162
(Continued)

FOREIGN PATENT DOCUMENTS

CN 201677135 U * 12/2010
CN 104718446 A * 6/2015 ........... F01D 21/003
(Continued)

OTHER PUBLICATIONS

Translation CN-201677135 (Year: 2010).*
Translation CN207067509 (Year: 2018).*
Translation WO-2005067112 (Year: 2018).*

*Primary Examiner* — Peter J Macchiarolo
*Assistant Examiner* — Monica S Young
(74) *Attorney, Agent, or Firm* — Thomas E. Lees, LLC

(57) ABSTRACT

A gear inspection system comprises a spindle that receives a gear for inspection. The spindle includes an arbor with a central tapered structure, an annular substrate coupled to securements, each securement having a post and a ball. The arbor includes a bias member (which could be the posts of the securements) to bias the securements toward the central tapered structure such that the securements maintain contact with the central tapered structure regardless of a location of the annular substrate. The gear inspection system also includes a fixing mechanism that positions the gear on the spindle, a laser that emits a signal at a point of interest of the gear creating a reflected signal, and a receiver that receives the reflected signal. A processor transforms inputs from a user interface into adjustment instructions wherein an adjustment in a certain orientation is independent of an adjustment in other orientations.

13 Claims, 9 Drawing Sheets

(51) Int. Cl.
 *G01B 5/004* (2006.01)
 *G01M 13/021* (2019.01)
(58) Field of Classification Search
 USPC .......................................................... 73/162
 See application file for complete search history.

(56) References Cited

U.S. PATENT DOCUMENTS

| | | | | |
|---|---|---|---|---|
| 4,547,674 | A * | 10/1985 | Pryor | G01B 11/2416 |
| | | | | 250/559.38 |
| 2002/0127070 | A1* | 9/2002 | Mawhinney | B23B 49/005 |
| | | | | 408/139 |
| 2011/0032538 | A1* | 2/2011 | Maschirow | G01M 13/021 |
| | | | | 356/601 |
| 2014/0346095 | A1* | 11/2014 | Kujacznski | B07C 5/34 |
| | | | | 209/579 |
| 2015/0276549 | A1* | 10/2015 | Lazic | B23F 23/02 |
| | | | | 209/552 |
| 2019/0249983 | A1* | 8/2019 | Wagaj | G01B 5/008 |
| 2020/0061739 | A1 | 2/2020 | Slone | |

FOREIGN PATENT DOCUMENTS

| | | | | | |
|---|---|---|---|---|---|
| CN | 207067509 | U | * | 3/2018 | ........... B23K 26/703 |
| KR | 20130086482 | A | * | 8/2013 | |
| WO | WO-2005067112 | A1 | * | 7/2005 | ............. H01S 3/025 |
| WO | WO-2018048872 | A1 | * | 3/2018 | ......... G01B 11/2416 |

\* cited by examiner

GEAR INSPECTION SYSTEM

CROSS REFERENCE TO RELATED APPLICATIONS

This application claims the benefit of U.S. Provisional Patent Application Ser. No. 63/083,401, filed Sep. 25, 2020, entitled "GEAR INSPECTION SYSTEM", the disclosure of which is hereby incorporated by reference.

BACKGROUND

Various aspects of the present invention relate generally to gear inspection systems using a laser and more specifically to including laser gear inspection systems proximate or within a gear manufacturing cell.

A gear is created using a gear manufacturing cell, for example a grinding machine that uses a grinding wheel to removes pieces of a blank, a hobbing machine that uses a hob to remove pieces of the blank, other machines, or combinations thereof. When everything runs smoothly, the gears that are created are in a good working condition and uniform. However, if the grinding wheel, hob, or other device breaks down, then there may be some variation in the gears from an optimal gear. These suboptimal gears may break down and cause damage in which ever devices they are in. As such, gears are inspected to determine if there is any variation from the optimal gear. If the gear is optimal, then everything is fine. However, if there is a variation, then the gear is scrapped, and the grinding wheel, hob, or other device may be redressed or replaced.

BRIEF SUMMARY

According to aspects of the present disclosure, a gear inspection system comprises a spindle with a portion to receive the gear for inspection. The spindle includes an arbor with a central tapered structure, an annular substrate coupled to securements, each securement having a post and a ball coupled to a top of the post. The arbor further includes a bias member coupled to the securements to bias the securements toward the central tapered structure such that the balls of the securements maintain contact with the central tapered structure regardless of a location of the annular substrate along the central tapered structure. In some embodiments, the bias member is the post of the individual securements. The gear inspection system also includes a fixing mechanism that positions the gear on the spindle, a laser that emits a signal at a point of interest of the gear to create a reflected signal, and a receiver that receives the reflected signal. A six-point adjustment system coupled to the laser allows a user to orient the laser in a horizontal direction, a vertical direction, a depth direction, roll, pitch, yaw, or combinations thereof. A processor transforms the inputs from the user interface into adjustment instructions for the six-point adjustment system, wherein an adjustment in one of the orientations of the six-point adjustment system is independent of an adjustment in the other orientations.

According to further aspects of the present disclosure, a gear inspection system comprises a spindle with a portion to receive the gear for inspection, a fixing mechanism that fixes the gear to the spindle, and a laser that emits a signal at a point of interest of the gear to create a reflected signal. A pressurized cover covers the laser and includes a pressurized air input that receives pressurized air from an associated pressurized air source; an outlet that aligns with a lens of the laser; and a hollow between the pressurized air input and the outlet. The pressurized air fills the hollow, and the air escapes from the hollow through the outlet to prevent particles from contaminating the lens of the laser and to cool down the laser. A receiver receives the reflected signal, which is processed to inspect the gear. A user interface accepts inputs from a user for adjustments to a six-point adjustment system that adjusts the laser in a horizontal direction, a vertical direction, a depth direction, roll, pitch, yaw, or combinations thereof. A processor transforms the inputs from the user interface into adjustment instructions for the six-point adjustment system, wherein an adjustment in one of the orientations of the six-point adjustment system is independent of an adjustment in the other orientations.

According to still further aspects of the present disclosure, a process for aligning and analyzing a gear comprises receiving a gear to be inspected on a spindle and adjusting an arbor of the spindle to fix the gear on the spindle. The gear is rotated (e.g., nudged) on the spindle to ensure that a tooth of the gear is not radially aligned with a fixing mechanism, and then the gear is adjusted on the spindle by inserting a ball of the fixing mechanism into a space to be inspected of the gear. The ball is then removed from the space to be inspected of the gear. A signal is emitted from the laser into the space to be inspected, and reflections of the signal off the space to be inspected are read (i.e., sensed, detected, etc.) by a receiver. Data obtained from the reflections are used to determine whether the space to be inspected of the gear meets standards for that gear.

Embodiments of the gear inspection systems and processes may be internal to a gear manufacturing cell or external to the gear manufacturing cell. Moreover, the robotic arm may be internal or external to the gear manufacturing cell. In some embodiments, the system further comprises a guard that protects the gear inspection system.

DETAILED DESCRIPTION

Laser-Based Gear Inspection System

Figure 1:
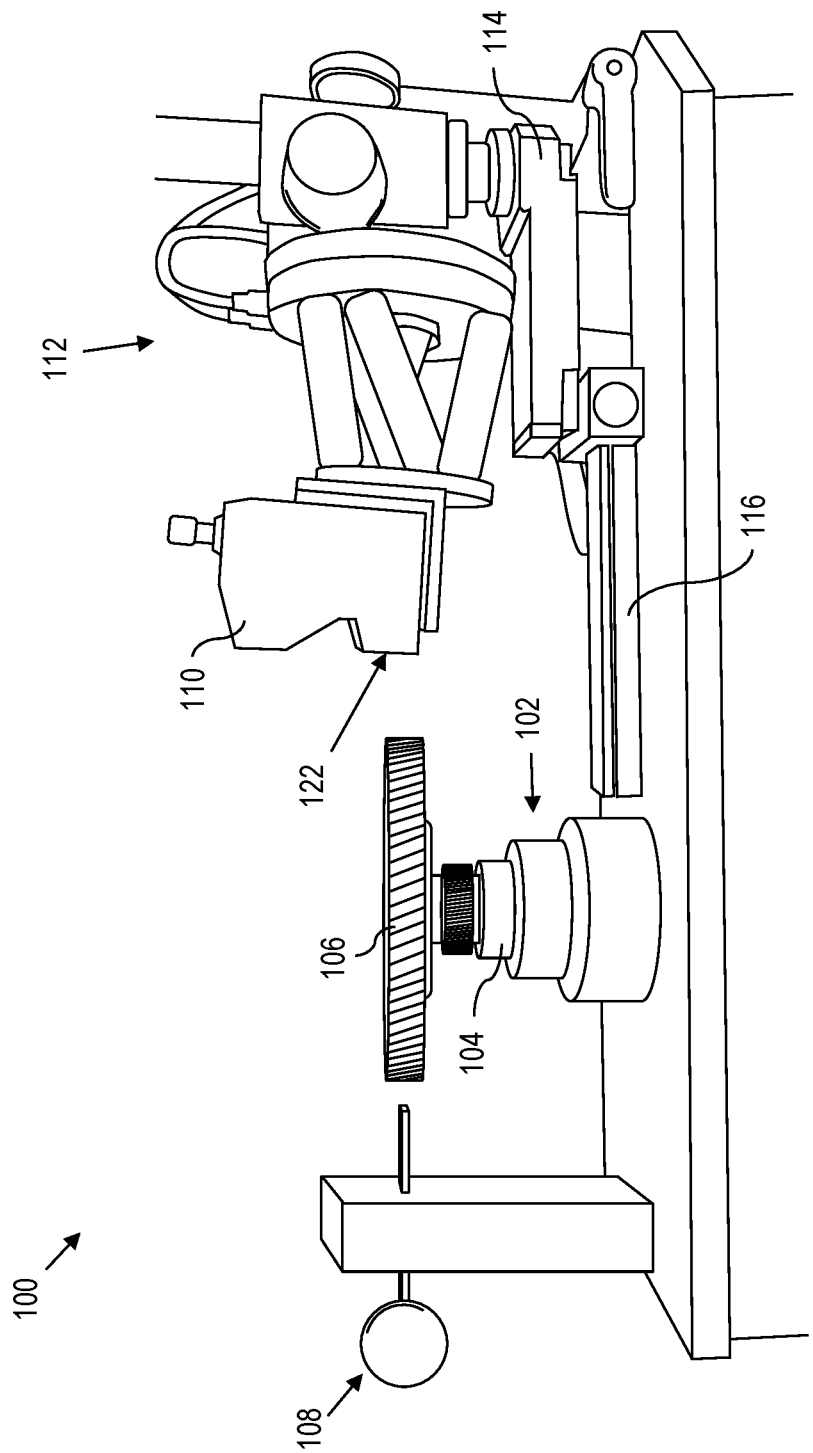
FIG. 1 is a block diagram illustrating a system for inspecting a gear with a laser, according to various aspects of the present disclosure.

Turning now to FIG. 1, a block diagram of a laser-based gear inspection system 100 is shown. The gear inspection system 100 includes a spindle 102 that includes a portion 104 to receive an associated gear 106 for inspection. The spindle 102 is free to rotate the gear 106 during an inspection process. Some embodiments of the gear inspection system use a fixed arbor instead of a spindle, as discussed below.

Further, various embodiments of the gear inspection system 100 include a fixing mechanism 108 that prevents the gear 106 for inspection from rotating while the gear inspection system 100 is being set up for the inspection process (i.e., the fixing mechanism positions the gear on the system). For example, a ball plunger may be used as the fixing mechanism 108 such that a plunger portion is disposed in a tooth gap of the gear 106 for inspection.

In some embodiments, the fixing mechanism 108 is retracted after the gear 106 is positioned, as discussed below. In many embodiments, the gear remains stationary while inspection occurs. In various embodiments, the gear 106 may be rotated during testing. For example, the gear may be continuously rotated during the test or rotated, then analyzed, then moved again for another analysis and so on.

The gear inspection system 100 further includes a laser 110 coupled to a six-point adjustment system 112 on a mount 114. In some embodiments, the mount 114 is on a slide 116 so the mount 114, six-point adjustment system 112, and the laser 110 may be moved closer or further (i.e., a depth direction relative to the gear 106, which is left/right in FIG. 1). Thus, the slide 116 allows for a coarse adjustment in the depth direction. The laser 110 may be a single-point laser or a multipoint laser.

In order to make fine-tuned adjustments, the six-point adjustment system 112 can move and change orientation of the laser 110. As used herein, an orientation and an orientation adjustment not only include a direction but also include a location. Thus, an orientation adjustment may be in roll, pitch, yaw as normal, but also includes horizontal, vertical, and depth adjustments. The six-point adjustment system may be a Gough-Stewart platform (i.e., a hexapod) that may be electronically activated, mechanically activated, or both. For example, referring to FIG. 2, the mechanically activated hexapod 212 includes a positioner platform 214 with twelve positioners 216a-1 (although any number of positioners may be used). The positioner platform 214 may be rotated around an axis 218 and may be keyed to ensure that six of the positioners 216 align with six independent legs 220a-f. Each positioner 216 is individually adjustable in the vertical (i.e., axial) direction so each can have a different vertical distance (i.e., height) from the positioner platform 214 to an end of the positioner 216. Thus, a user can manually adjust the heights of each of the positioners and lock them into place.

As there are twelve positioners shown 216 and the positioner platform rotates around the axis, the positioners can provide two independent positions for contact with the legs 220. For example, in a first rotation of the positioner platform, positioners 216a, b, e, f, i, and j make contact with legs 220a-f, respectively. In a second rotation, positioners 216c, d, g, h, k, and l make contact with legs 220a-f, respectively. Thus, the first position is completely independent of the second position. If eighteen positioners are included, then three independent positions may be created, and so on.

Further, if there can be overlap between rotations, then there may be twelve dependent positions. For example, in a first rotation, positioners 216a, b, e, f, i, and j make contact with legs 220a-f, respectively. In a second rotation, positioners 216b, c, f, g, j, and k make contact with legs 220a-f, respectively.

Moreover, the positioner platform 214 moves vertically (i.e., axially) in order to make contact between the positioners 216 and the legs 220. The movement may be performed manually by a user, through a linear actuator, etc., or combinations thereof. Further, stoppages 222a-b extend from a first stage 224 to ensure that the positioner platform 214 and positioners 216 do not push the legs 220 too far. Thus, in several embodiments, the length of the stoppage 222 is greater than the length of the positioners 216 above the positioner platform 214.

The legs 220 extend through the first stage 224 via linear bearings 226 and through a second stage 228 via linear bearings 230. The each of the legs 220 couples to an associated shaft 232 through corresponding universal joints 234. Moreover, each of the shafts 232 couple to extensions of a laser platform 236 through more universal joints 238. As there are six independent legs 220, corresponding to six independent shafts 232, corresponding to six independent extensions 239, the laser platform 236 has six degrees of adjustability for positioning a laser 240. Further, the positioner platform may be used for a coarse adjustment of all legs, and the positioners may be used as fine tuning for the legs.

In use, the user can manually set the lengths of the positioners as discussed above to create two or more overall positions for the laser platform 236. Then, by moving the positioner platform 214, the laser platform 236 may be placed in one of those positions. A spring member 242 contracts such that the laser platform 236 is pushed toward the positioner platform 214 and a bias member. In some embodiments, to change the contraction strength of the spring, the spring must be changed out for another spring. In other embodiments, an adjustment screw or bias member may be used to change the contraction strength of the spring.

An electrically activated hexapod uses servos to adjust the six degrees of adjustability and does not use the legs, positioners, and positioner platform described above.

Referring back to FIG. 1, the laser 110 emits a signal at a point of interest on the gear 106 (e.g., a space between teeth of the gear, a tooth of the gear, etc.). When the signal hits the point of interest, a reflection of the signal is created, and a receiver 122 receives the reflected signal. In some embodiments, portions of the reflected signal that lack integrity may be masked out to remove some of the reflection that lacks integrity. However, in some cases, the masked version of the reflected signal may still lack integrity, or the system may not include a masking feature. As such, the reflection of the signal is then processed by a processor to create a data plot of the reflection, which is representative of a structure of the gear 106 under inspection. If the reflection lacks integrity (e.g., if the reflection is missing any points, if the reflection is unstable, if the signal lacks strength, etc.), then the six-point adjustment system 112 can be adjusted to direct the signal to the point of interest from a different angle by adjusting the laser in a horizontal direction, a vertical direction, a depth direction, roll, pitch, yaw, or combinations thereof.

For example, in some embodiments, the gear inspection system 100 transforms the reflected signal into a data plot for display on an associated display, which also displays a user interface that accepts inputs from a user to manually adjust an orientation of the laser 110. The accepted inputs may be an absolute orientation or may be a relative orientation (i.e., a change from the previous orientation).

The processor then transforms the inputs from the user interface into adjustment instructions for the six-point adjustment system. Thus, an adjustment in one of the orientations of the six-point adjustment system is independent of an adjustment in the other orientations. For example, an adjustment in yaw does not affect a horizontal position of the laser 110.

In numerous embodiments, the adjustments to the six-point adjustment system 112 are performed automatically. For example, the processor determines whether there is an instability in the reflection of the signal (e.g., reflected points are jumping around or scattered). If there is an instability, the processor determines which side of the point of interest is creating the instability and determines a horizontal adjustment to adjust the laser 110 away from the side of the point of interest that is creating the instability in the reflection. The horizontal adjustment is then sent to the six-point adjustment system 112, and the six-point adjustment system 112 then adjusts the orientation of the laser 110. Then, if a yaw adjustment is required to point the laser 110 back to the point of interest, then the processor determines a yaw adjustment in a direction toward the point of interest to correspond with the horizontal adjustment of the laser and sends the yaw adjustment to the six-point adjustment system 112 to adjust the laser 110 to point back at the point of interest.

As another example of automatic adjustment, the processor (see FIG. 9) determines a signal strength of the reflection of the signal and then determines a roll adjustment based on the determined signal strength. For example, a weaker signal strength means the laser 110 should be adjusted in a direction of a helix of the gear. Then, the roll adjustment is sent to the six-point adjustment system 112 to adjust the laser 110 to strengthen the signal.

A further example includes having the processor determine whether there are any missing points in the reflection of the signal. Such missing points are indicative of a shadow. As such, the processor determines a pitch adjustment to give the laser 110 a line of sight to the area of interest. Then, the pitch adjustment is sent to the six-point adjustment system 112 to adjust the laser 110 to remove shadows.

Other automatic adjustments may be generated and sent to the six-point adjustment system 112. Further, the automatic adjustments may be iterated through to find an optimal orientation of the laser 110.

Once an optimal orientation (i.e., the signal hits the point of interest orthogonally) is found (automatically, manually, or both), then the orientation instructions are stored in memory (see FIG. 9) for later retrieval to find the optimal point again when a similar gear is placed in the gear inspection system 100 for inspection. The orientation instructions stored may be relative orientation instructions or a final set of absolute orientation instructions.

The gear inspection system 100 of FIG. 1 has benefits over existing solutions, because only one laser is required to find an optimal orientation. However, in existing solutions, up to five lasers are required. Further, the six-point adjustment system 112 allows for six different adjustments that are independent of each other. In existing systems, a manual adjustment is required and exists in several different stages, where an adjustment of one stage may affect a different stage.

Cover for Laser

Figure 2:
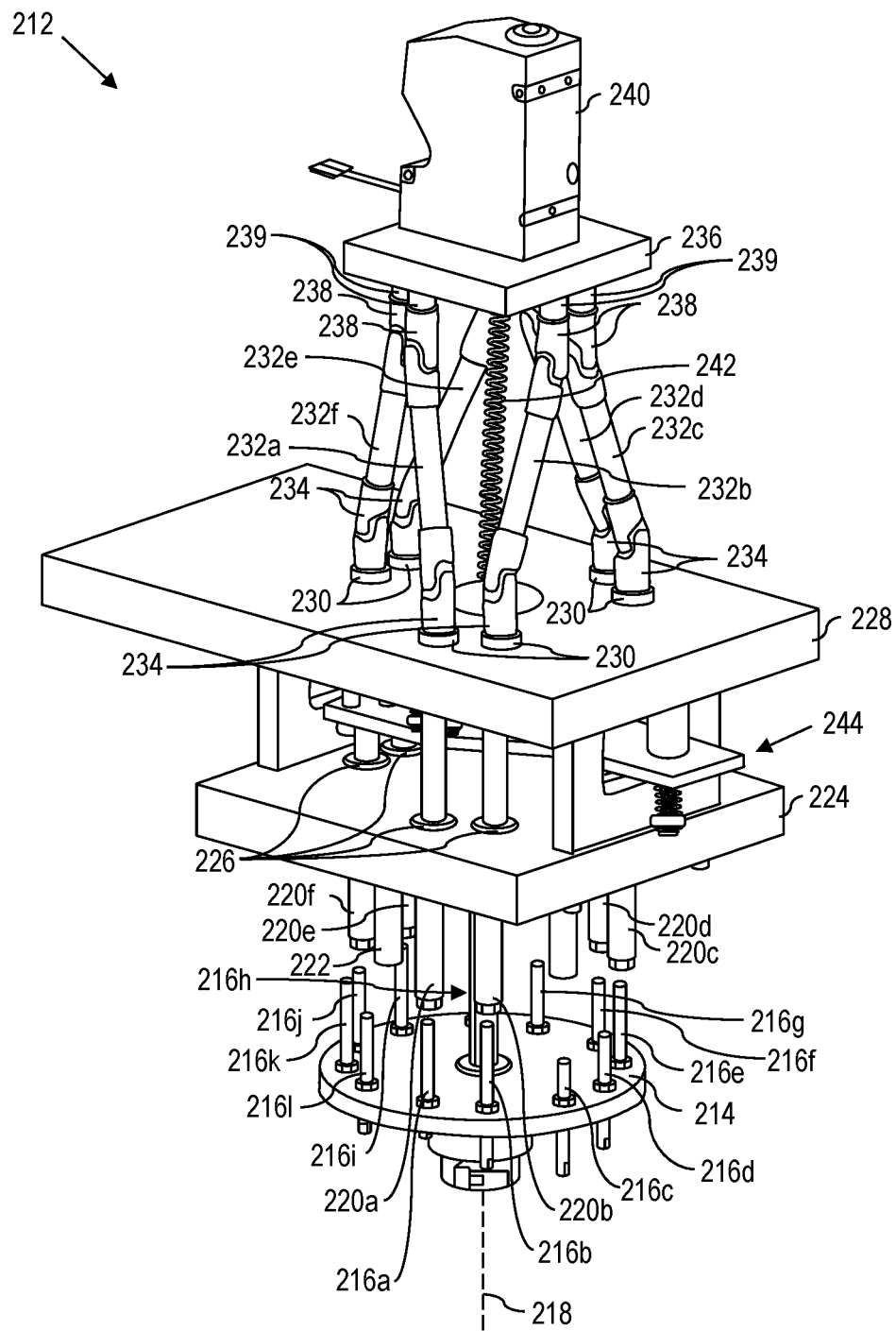
FIG. 2 is a diagram showing a mechanical hexapod with six degrees of movement, according to various aspects of the present disclosure.
Figure 3:
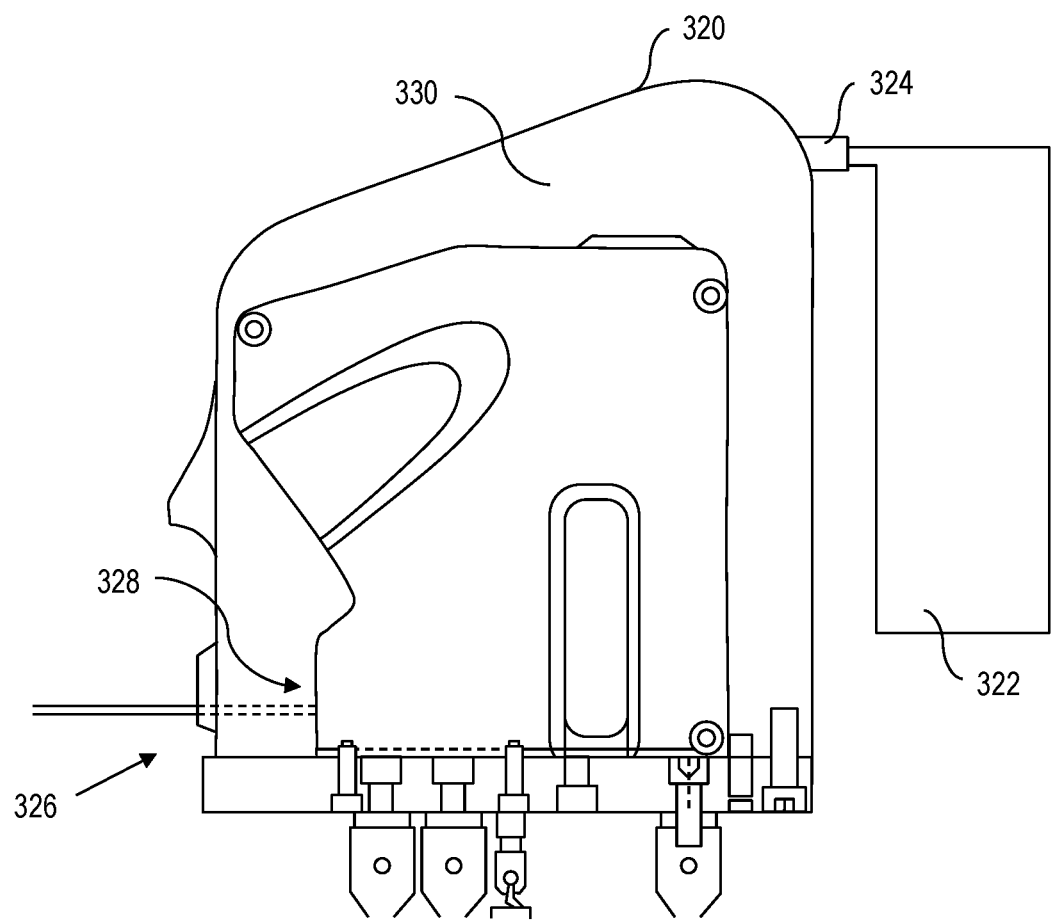
FIG. 3 is a diagram illustrating a cover for a laser to be used in gear inspection systems, according to various aspects of the present disclosure.

Turning now to FIG. 3, a cover 320 is shown covering a laser 110 (e.g., the laser 110 of embodiments of the gear inspection system 100 associated with FIGS. 1 and 2). The cover 320 is pressurized by receiving pressurized air from a pressurized air source 322 via a pressurized air input 324. An outlet 326 in the cover 320 (which aligns with a lens(es) 328 of the laser 310 when the cover 320 covers the laser 310) allows pressurized air to flow out of the pressurized cover 320 at a relatively constant rate based on the pressurization of the cover 320. Thus, the pressurized air source provides air to the cover 320, which fills a hollow 330 of the cover 320 (e.g., at sixty pounds per square inch gauge (PSIG)), and the air then flows out of the outlet 326 near the lens 328 of the laser 310. The air flowing out of the outlet 326 prevents dust, oil, and other particles from contaminating the lens 328 of the laser 310 by propelling the dust, oil, and other particles away from the lens 328 of the laser 310.

Further, the pressurized air creates an airflow across the laser 310, and that airflow absorbs heat from the laser while the laser 310 is operating. Then, the heated air is passed out of the outlet 326 (as indicated above), which removes heat from the system. Thus, the pressurized cover not only acts as a device to keep the lens(es) of the laser from becoming contaminated with stray particles, it provides an air flow to cool down the laser when in use.

Often, a laser that is exposed to oil particles will produce incorrect readings of a gear under inspection, and when that happens, the gear inspection system must be halted while the lens(es) of the laser are cleaned, which results in unnecessary down time. Further, in some situations, where the inspection of the gears takes place in a less-temperature controlled environment, cooling the laser with the airflow helps reduce an amount of downtime to ensure that the laser is operating at a proper temperature range. Thus, the pressurized cover described herein allows the laser gear inspection system to be used in environments where it may not have been able to be used (as efficiently) using current laser-based gear inspection systems.

Three-Ball Arbor

Figure 4:
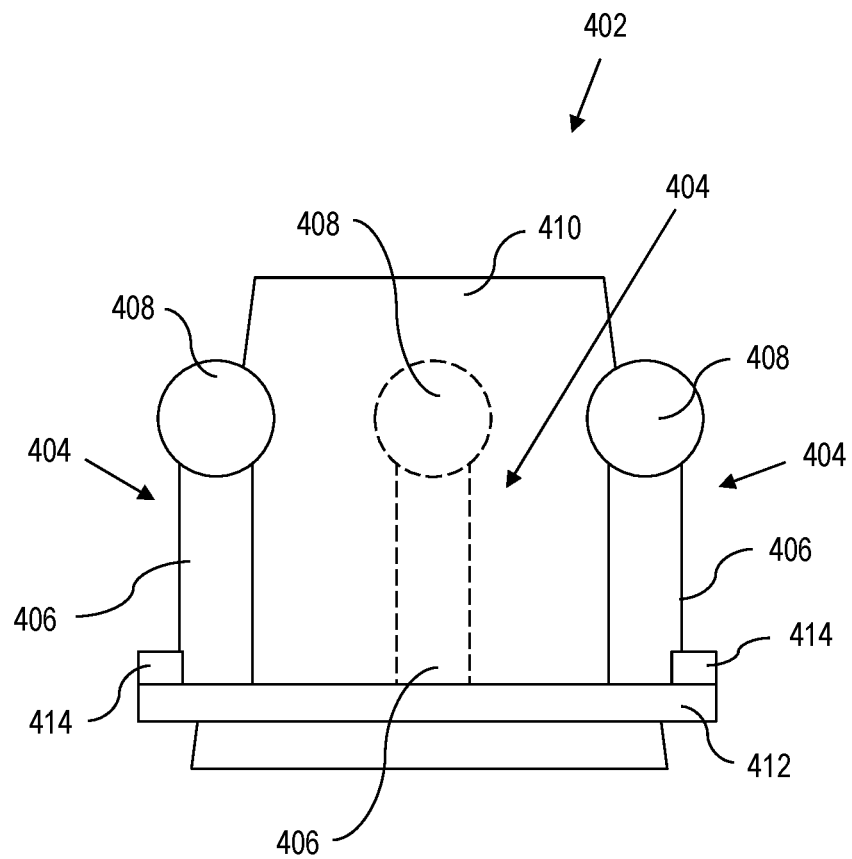
FIG. 4 is a diagram of an arbor to affix a gear for inspection to a gear inspection system, according to various aspects of the present disclosure.

As discussed above, some embodiments of the gear inspection system use an arbor as opposed to a spindle for holding a gear under inspection. An embodiment of such an arbor 402 is shown in FIG. 4. The arbor 402 includes securements 404 that each have a post 406 with a ball 408 coupled to the posts 406. As shown in FIG. 4, there are three securements 404, but other numbers of securements 404 may be used. The arbor 402 further includes a central tapered structure 410 (e.g., a cone, conical frustum, pyramid, etc.). The taper may be linear as described herein (e.g., cone) or any other continuous (e.g., non-stepped) function. The securements are coupled to an annular substrate 412 that traverses vertically (i.e., axially) relative to the tapered structure 410, while in some embodiments, the central tapered structure moves instead or as well as the substrate. The annular substrate 412 includes a hole that allows the annular substrate to surround the tapered structure. However, the annular substrate is not required to be circular, but can be an oval, a regular polygon, an irregular polygon, etc. The substrate 412 or central tapered structure 410 traverses in any desired way (e.g., manually by a user, a mechanical level, a pneumatic system, electronics, motors, etc.).

Moreover, the arbor 402 includes a bias member 414 (e.g., a spring, a spring constant within the posts itself, etc.) that biases the securements 404 toward the central tapered structure 410 such that the balls 408 of the securements touch the tapered structure 410 no matter where the substrate 412 is relative to the central tapered structure. For example, as the substrate 412 moves down relative to the central tapered structure 410 the balls move outward from the central tapered structure (i.e., radially from the axis of the central tapered structure) while still being in contact with the central tapered structure. Conversely, as the substrate 412 moves up relative to the central tapered structure 410 the balls move inward to the central tapered structure, as the biasing member forces the balls to maintain contact with the central tapered structure. In some embodiments, the substrate moves up and down the central tapered structure, and in various embodiments, the central tapered structure moves up and down the substrate.

The arbor 402 can be used to provide a non-rotating three-point contact on a bore of a gear to be inspected. The force on the bore is repeatable and approximately equal at the three points of contact. When inspection is finished, the substrate moves up the central tapered structure, and the gear can be removed.

Indexer and Fixing Mechanism

As discussed above, a fixing mechanism may be used to position and fix a gear from inspection in place. In existing systems, if a ball plunger is used as the fixing mechanism, it usually goes in a space between teeth of the gear under inspection, where the space is not a space being inspected by the laser. However, in a repeating structure (e.g., alternating spaces and teeth of a gear), there is a possibility that error occurs or is amplified for an amount of spaces that the fixing mechanism is away from the space being inspected.

Figure 5:
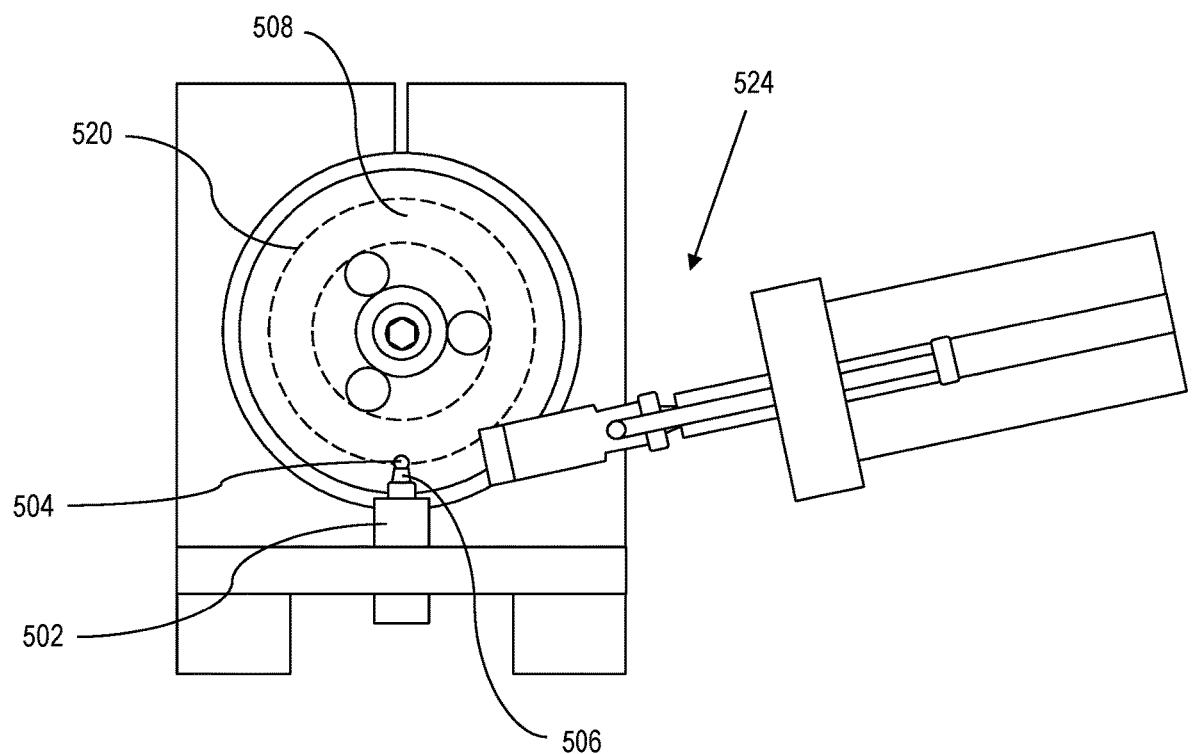
FIG. 5 is a diagram illustrating an indexer and fixing mechanism for aligning a gear for inspection in a gear inspection system, according to various aspects of the present disclosure.

A fixing mechanism and process for using the fixing mechanism in aligning and analyzing a gear are disclosed below. The fixing mechanism 502, as shown in FIG. 5, includes a ball 504 and a post 506. The ball includes a diameter based on a size of a space present in a gear 508 to be inspected (shown in dotted lines in FIG. 5). Thus, as long as the ball does not hit a major diameter 520 (also referred to as a tip diameter) or a minor diameter of the gear 508, the ball 504 can slide easily into a space contacting flanks (teeth) of the space (i.e., an involute) and align the gear properly. To ensure that the ball does not hit the major diameter 520 of the gear, an indexer 524 is placed such that the indexer can nudge the gear to be inspected non-radially (e.g., at a tangent or secant to the gear) to rotate the gear such that a tooth of the gear is not radially aligned with the ball of the fixing mechanism. Thus, the indexer and the ball of the fixing mechanism work together as a coarse-tune adjuster and a fine-tune adjuster, respectively, to align the gear for inspection.

Once the gear is aligned, the fixing mechanism is retracted, so the laser can inspect the space that the ball was previously in. In other words, the space that is used for aligning the gear is also the space that is inspected by the laser. This has a benefit of ensuring that the space that is being inspected is properly aligned regardless of repeating issues or other issues with the gear. Further, using the indexer and fixing mechanism described herein, the spindle is not required to be able to move on its own (e.g., servo motors are not required to rotate the spindle directly to align the gear).

Process for Aligning and Analyzing a Gear

Figure 6:
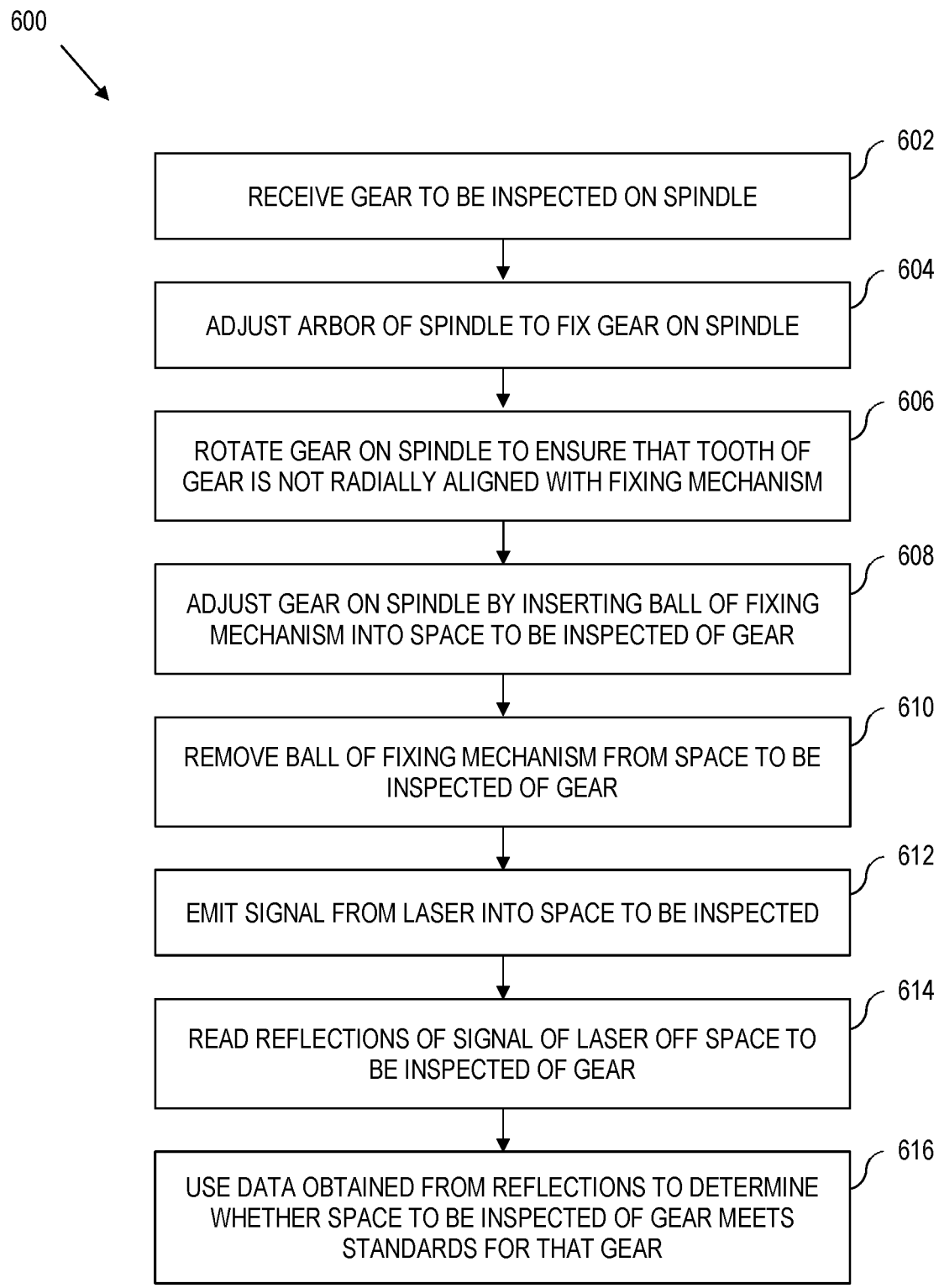
FIG. 6 is a flow chart illustrating a process for aligning and inspecting a gear, according to various aspects of the present disclosure.

Turning now to FIG. 6, a process 600 for aligning and analyzing a gear is shown. At 602, a gear is received on a spindle of a gear inspection system. The gear inspection system can be an embodiment of the gear inspection systems discussed herein. The gear may be placed manually, by robotics (e.g., robotic arms discussed below), or other methods. At 604, the gear is fixed to the spindle by adjusting an arbor of the spindle. For example, using an embodiment of the arbor of FIG. 4, the substrate holding the securements may be lowered (e.g., manually, electronically, pneumatically, combinations thereof, etc.) to expand the three securements on the arbor to ensure contact of the balls of the securements between both the gear and the central tapered structure.

At 606, the gear is rotated on the spindle as a coarse adjustment to ensure that a tooth of the gear is not radially aligned with a fixing mechanism. For example, the indexer described in association with FIG. 5 can be used to nudge the gear at a tangent or a secant to rotate the gear as a coarse adjustment. Thus, there is no need to have a motorized spindle.

At 608, the alignment of the gear is fine-tuned by adjusting the gear on the spindle by inserting a ball of the fixing mechanism into a space to be inspected of the gear. For example, the fixing mechanism as described in reference to FIG. 5 may be used to adjust the gear. This can be done manually, pneumatically, electrically, etc.

At 610, the ball of the fixing mechanism is removed (e.g., retracted) from the space to be inspected of the gear. The fixing mechanism may be removed by any means, which may be different than the means (e.g., manually, pneumatically, electrically, etc.) that inserted the ball into the space.

At 612, a signal is emitted from the laser to the space to be inspected. The laser may be covered by an embodiment of the pressurized cover discussed above. Thus, the laser can be kept free from particulates and can be kept cooler due to the flow of air through the pressurized cover. Also, as noted above, the space to be inspected is the space that the ball of the fixing mechanism was in when fine tuning alignment of the gear.

At 614, reflections of the emitted signal of the space to be inspected are read, data about those reflections is obtained (e.g., time of flight, amplitude, frequency, combinations thereof, etc.), and stored in memory of a computing system. Then at 616, the data obtained about the reflections is used to determine whether the space to be inspected of the gear meets standards for that gear. If the gear does meet inspection standards, then the system may take a first action (e.g., indicate that the gear matches, control a robotic arm to sort the gear to a "matching" section, etc.). On the other hand, if the gear does not meet inspection standards, then the system may take a second action (e.g., indicate that the gear does not meet inspection standards, sort the gear to a "non-matching" section, etc.).

Gear Inspection System in Tandem with Gear Manufacturing Cell

Figure 7:
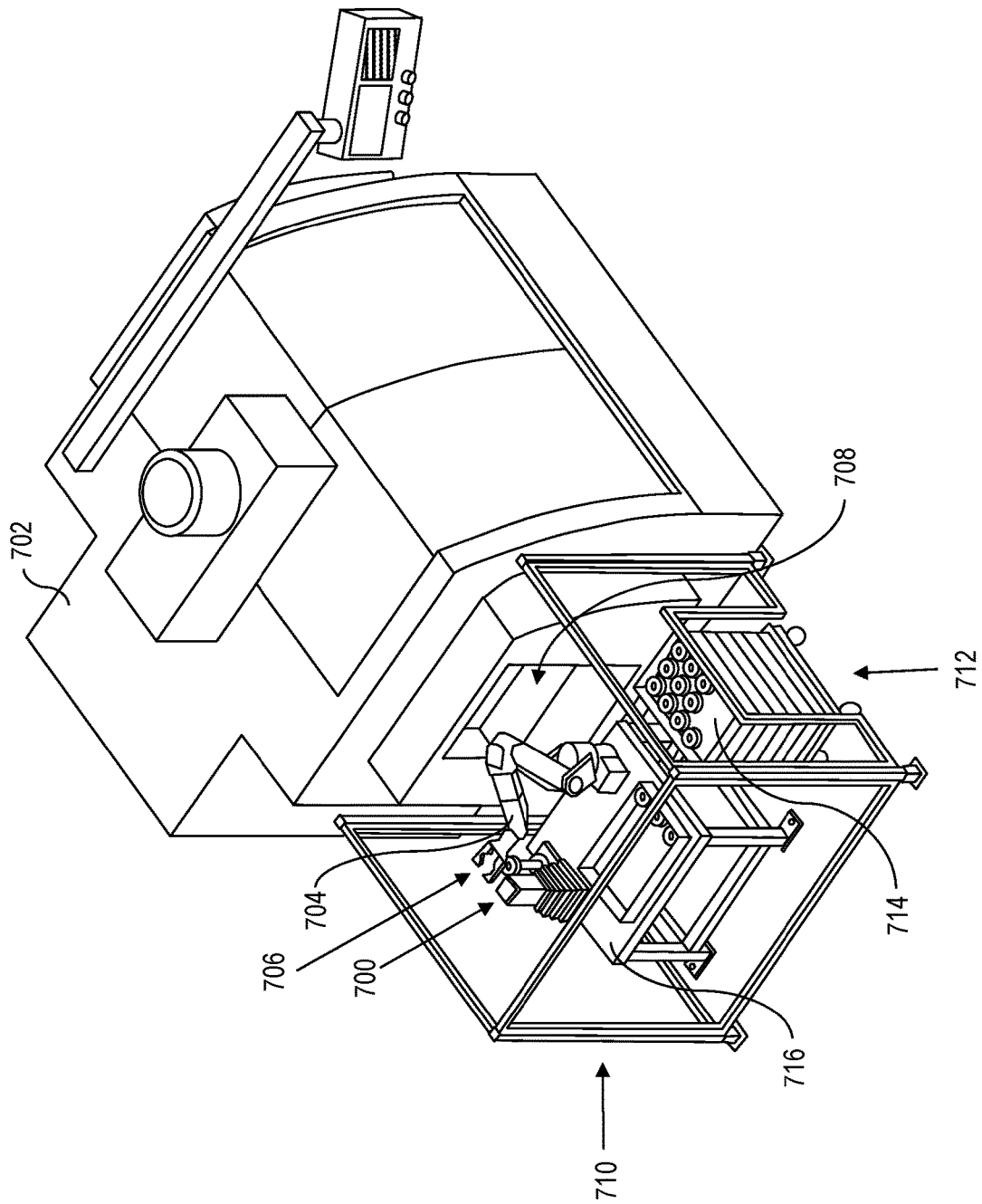
FIG. 7 is a diagram illustrating a system for inspecting gears, where a gear inspection system is located external to a gear manufacturing cell, according to various aspects of the present disclosure.

Embodiments of the gear inspection system described above can be a stand-alone (e.g., on a mobile platform to be placed near a gear manufacturing system) or in-line with a gear manufacturing system. FIG. 7 illustrates a first embodiment of a gear inspection system 700 integrated with a gear manufacturing cell 702. The gear inspection system 700 includes features described above and further includes a robotic arm 704 with a gripper 706 that transfers a gear for inspection from the gear manufacturing cell 702 to the spindle (104, FIG. 1) of the gear inspection system 700. In the embodiment of FIG. 7, the gear inspection system 700 and the robotic arm 704 are external to the gear manufacturing cell 702 and reaches into the gear manufacturing cell 702 through an opening 708 within the gear manufacturing cell 702.

Further, a guard 710 may be placed proximate to the gear inspection system 700 to protect the gear inspection system 700. In some embodiments, the guard 710 includes a passage 712 to allow for a cart, pallet, or other transportation device 714 to be moved proximate to a platform 716 supporting the gear inspection system 700. While the guard 710 protects the gear inspection system 700, the guard 710 does not house the gear inspection system 700.

Figure 8:
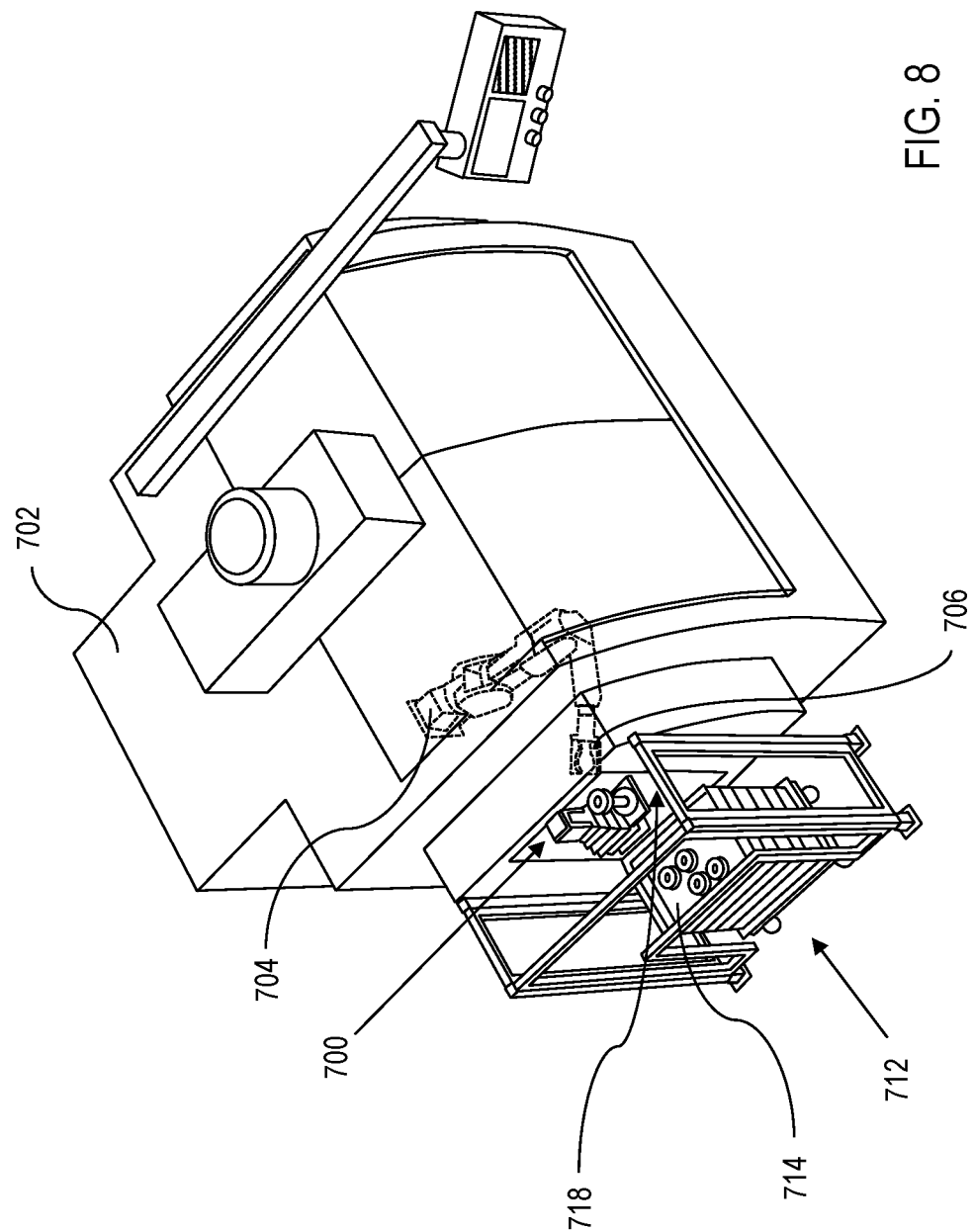
FIG. 8 is a diagram illustrating a system for inspecting gears, where a gear inspection system is located internal to a gear manufacturing cell, according to various aspects of the present disclosure.

FIG. 8 illustrates a second embodiment of a gear inspection system 700 integrated with a gear manufacturing cell 702. The gear inspection system 700 includes features described above and further includes a robotic arm 704 with a gripper 706 that transfers a gear for inspection from the gear manufacturing cell 702 to the spindle (104, FIG. 1) of the gear inspection system 700. In the embodiment of FIG. 8, the gear inspection system 700 and the robotic arm 704 are internal ("on board") to the gear manufacturing cell 702, and the robotic arm reaches out of the gear manufacturing cell 702 through an opening 718 within the gear manufacturing cell 702 to place inspected parts on a tray, cart, pallet, etc. for transport 714.

As with the embodiment of FIG. 7, a guard 710 may be placed proximate to the opening in the gear manufacturing cell. In some embodiments, the guard 710 includes a passage 712 to allow for a cart, pallet, or other transportation device 714 to be moved proximate to the opening 718.

Other embodiments also are possible. For example, the robotic arm may be inside the gear manufacturing cell while the gear inspection system is external to the gear manufacturing cell. Also, the robotic arm may be external to the gear manufacturing cell while the gear inspection system is internal to the gear manufacturing cell.

Figure 9:
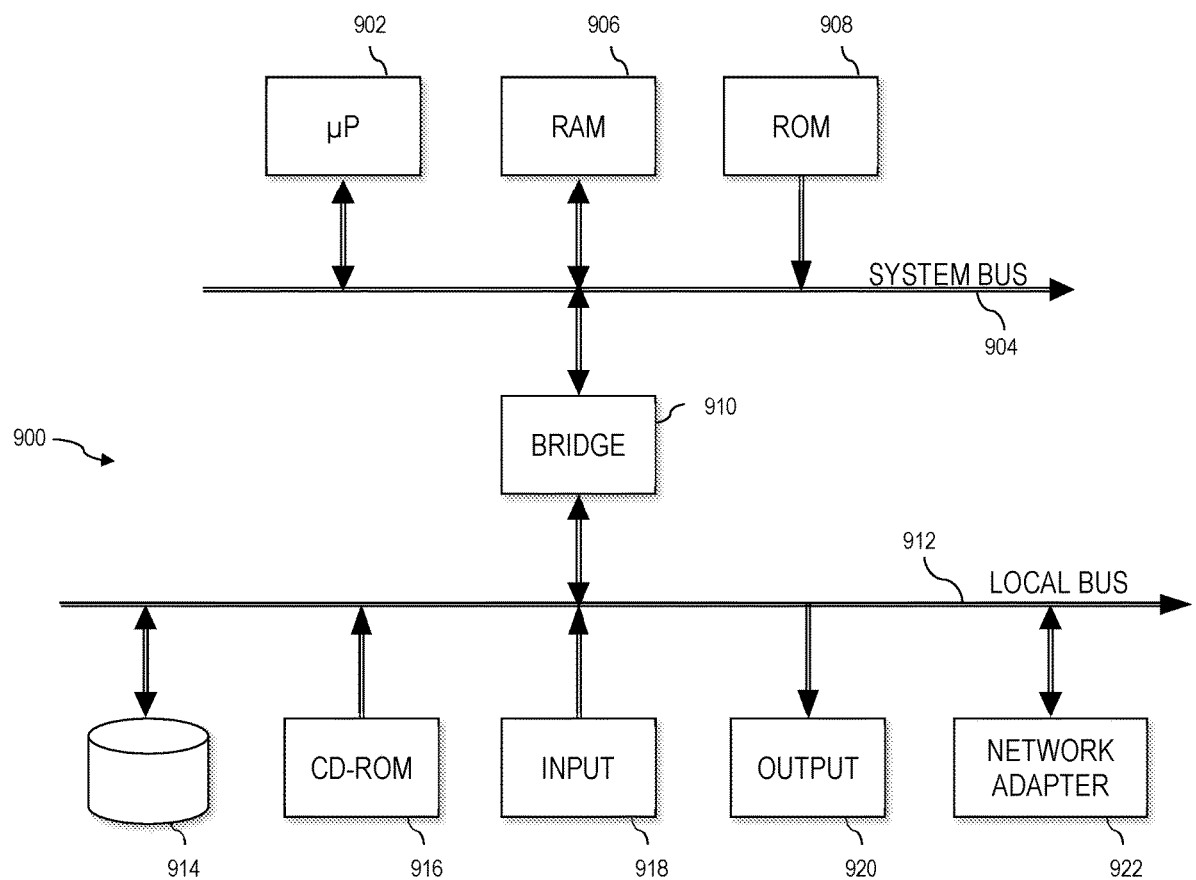
FIG. 9 is block diagram of a general computer system that may implement processes for aligning a laser for gear inspection, according to various aspects of the present disclosure.

Referring to FIG. 9, a block diagram of a hardware data processing system is depicted in accordance with the present disclosure. Data processing system 900 may comprise a symmetric multiprocessor (SMP) system or other configuration including a plurality of processors 902 connected to system bus 904. Alternatively, a single processor 902 may be employed. Also connected to the system bus 904 is local memory, e.g., RAM 906 and/or ROM 908. An I/O bus bridge 910 interfaces the system bus 904 to an I/O bus 912. The I/O bus 912 is utilized to support one or more buses and corresponding devices, such as storage 914, removable media storage 916, input devices 918, output devices 920, network adapters 922, other devices, combinations thereof, etc. For instance, a network adapter 922 can be used to enable the data processing system 900 to communicate with other data processing systems or remote printers or storage devices through intervening private or public networks.

The memory 906, 908, storage 914, removable media storage 916, or combinations thereof can be used to store program code that is executed by the processor(s) 902 to implement any aspect of the present disclosure described and illustrated in the preceding figures.

In some embodiments, the gear manufacturing cell includes the hardware data processing system. In other embodiments, the hardware data processing system is independent of the gear manufacturing cell.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A gear inspection system comprising:
    an arbor that includes:
        three securements, where each securement includes a post and a ball coupled to a top of the post;
        a central tapered structure;
        an annular substrate, wherein the securements are coupled to the annular substrate; and
        a bias member coupled to the securements to bias the securements toward the central tapered structure such that the balls of the securements maintain contact with the central tapered structure regardless of a location of the annular substrate along the central tapered structure, wherein the arbor does not rotate and provides a three-point contact on a bore of the gear for inspection;
    a fixing mechanism that positions the gear on the arbor;
    a laser that emits a signal at a point of interest of the gear to create a reflected signal;
    a receiver that receives the reflected signal;
    a processor;
    a six-point adjustment system coupled to the laser and the processor; and
    a user interface that accepts inputs from a user to adjust an orientation of the laser in at least one of:
        a horizontal direction;
        a vertical direction;
        a depth direction;
        roll;
        pitch; or
        yaw;
    wherein the processor transforms the inputs from the user interface into adjustment instructions for the six-point adjustment system, wherein an adjustment in one of the orientations of the six-point adjustment system is independent of an adjustment in the other orientations.

2. The gear inspection system of claim 1, wherein the bias member of the arbor is the posts of the securements.

3. The gear inspection system of claim 1, wherein the bias member of the arbor includes an individual bias member for each of the securements.

4. The gear inspection system of claim 1, wherein the annular substrate moves axially relative the central tapered structure.

5. The gear inspection system of claim 1, wherein the central tapered structure moves axially relative the annular substrate.

6. The gear inspection system of claim 1, wherein the central tapered structure is a conical frustum.

7. The gear inspection system of claim 1, wherein the laser is coupled to a pressurized cover that covers the laser, wherein the pressurized cover comprises:
    a pressurized air input that receives pressurized air from an associated pressurized air source;
    an outlet that aligns with a lens of the laser; and
    a hollow between the pressurized air input and the outlet; wherein:
        the pressurized air fills the hollow; and
        the air escapes from the hollow through the outlet.

8. The gear inspection system of claim 1, further comprising:
- an indexer used to provide a course adjustment of the gear for inspection while the gear for inspection is on the arbor;
- wherein the fixing mechanism includes a ball that goes in a space of the gear to be inspected to fine tune a position of the gear to be inspected.

9. A gear inspection system comprising:
- a spindle with a portion to receive the gear for inspection
- a fixing mechanism that fixes the gear to the spindle;
- a laser that emits a signal at a point of interest of the gear to create a reflected signal;
- a pressurized cover that covers the laser, wherein the pressurized cover comprises:
  - a pressurized air input that receives pressurized air from an associated pressurized air source;
  - an outlet that aligns with a lens of the laser; and
  - a hollow between the pressurized air input and the outlet;
  - wherein:
    - the pressurized air fills the hollow; and
    - the air escapes from the hollow through the outlet;
- a receiver that receives the reflected signal;
- a processor;
- a six-point adjustment system coupled to the laser and the processor; and
- a user interface that accepts inputs from a user to adjust an orientation of the laser in at least one of:
  - a horizontal direction;
  - a vertical direction;
  - a depth direction;
  - roll;
  - pitch; or
  - yaw;
- wherein the processor transforms the inputs from the user interface into adjustment instructions for servos of the six-point adjustment system, wherein an adjustment in one of the orientations of the six-point adjustment system is independent of an adjustment in the other orientations.

10. The gear inspection system of claim 9, wherein the pressurized cover couples directly to the laser.

11. The gear inspection system of claim 9, wherein the pressurized cover is not coupled directly to the laser.

12. The gear inspection system of claim 9, wherein the pressurized cover can withstand a pressure of at least sixty pounds per square inch.

13. The gear inspection system of claim 9, further comprising:
- an indexer used to provide a course adjustment of the gear for inspection while the gear for inspection is on the spindle;
- wherein the fixing mechanism includes a ball that goes in a space of the gear to be inspected to fine tune a position of the gear to be inspected.

* * * * *